US005618340A

United States Patent [19]
Krogh et al.

[11] Patent Number: 5,618,340
[45] Date of Patent: Apr. 8, 1997

[54] ASPHALT-BASED COATING COMPOSITION WITH ETHER AMINE-ACID-COMPLEX SURFACTANT

[75] Inventors: James A. Krogh, Janesville; Michael R. Sipe, Milton, both of Wis.

[73] Assignee: Tomah Products, Inc., Milton, Wis.

[21] Appl. No.: 684,129

[22] Filed: Jul. 19, 1996

[51] Int. Cl.⁶ .................................................. C09D 195/00
[52] U.S. Cl. ................................... 106/284.06; 106/284.4
[58] Field of Search ........................... 106/284.06, 284.4

[56] References Cited

U.S. PATENT DOCUMENTS

| | | | |
|---|---|---|---|
| 3,347,690 | 10/1967 | Galvin | 106/273.1 |
| 4,759,799 | 7/1988 | Vicenzi | 106/284.06 |
| 5,362,314 | 11/1994 | Vicenzi et al. | 106/284.4 |
| 5,362,690 | 11/1994 | Vicenzi et al. | 106/284.4 |

OTHER PUBLICATIONS

Product brochure from Surface Chemists of Florida, Inc. describing SURTECH AS–109 additive for asphalt compositions.
Product brochure from Chemax, Inc. describing MAXCOTE®RC–2015 additive for roof coating compositions.
Product brochure from Akzo Chemie describing Redicote CG roof coating composition.

*Primary Examiner*—David Brunsman
*Attorney, Agent, or Firm*—Jansson & Shupe, Ltd.

[57] ABSTRACT

The disclosure involves an improved asphalt roof-coating composition which includes asphalt, clay, and a novel ether amine-acid-complex surfactant. The surfactant comprises an alkyloxyalkylamine, preferably having an alkyl chain with from 8 to 20 carbon atoms and an acid present in an amount in excess of the amount required to neutralize the amine. The composition is less expensive than prior art formulations and has improved viscosity and gel stability.

17 Claims, 2 Drawing Sheets

ASPHALT-BASED COATING COMPOSITION WITH ETHER AMINE-ACID-COMPLEX SURFACTANT

FIELD OF THE INVENTION

This invention is related generally to coating compositions and, more particularly, to asphalt-based roof coatings for leak prevention and the like.

BACKGROUND OF THE INVENTION

Asphalt-based roof coatings having thick, highly-viscous characteristics have been used for many years to seal joints between roof membranes, join flashings to parapet walls and otherwise repair, seal and protect roof surfaces from exposure to the environment. These roof coating products are typically available in one to five gallon pails for use by homeowners or are available in bulk for use by professional roofing contractors.

Prior art asphalt-based roof coatings typically include asphalt, clay and a surfactant. The asphalt is used as a binder and the clay thickens the composition and provides gelling properties. The surfactant is present to produce optimum wetting and dispersion by reducing the interfacial tension between the asphalt and clay. Additives known as fillers may be included to provide bulk and other properties to the roof coating composition. These asphalt-based coating compositions are an improvement over earlier compositions which include asbestos. The asbestos is added to the composition to provide texture, strength and thixotropic properties to the formulation.

A roof coating composition which is effective for its purpose must have certain characteristics, most of which are a function of the surfactant selected for use in such composition. The roof coating composition must be relatively inexpensive to manufacture (so that it can be competitively priced) because the roof coating industry is intensely competitive. As those experienced in the art are aware, small price differences per unit volume have a significant effect on product sales and can mean the difference between success or failure in the marketplace. The high cost of the surfactant, in particular, makes certain prior art roof coating compositions expensive and places such products at a disadvantage in the marketplace.

The roof coating composition must have the appropriate physical characteristics to properly seal a wide range of roof surfaces and resist degradation when exposed to extreme environmental conditions. The composition must be highly viscous to adequately coat and seal the roof surface and to stay in place at the point of application. Viscosity, of course, refers to the thickness of the composition. Increased viscosity is desirable and indicates that the clay and asphalt constituents are well-dispersed, thereby assuring optimal performance of the composition. In addition to suitable viscosity, the composition should have superior gel stability meaning that the viscosity remains constant between manufacture and application to the roof surface.

While the composition must be viscous and have good gel stability, it should also be easy to manufacture and formulate. The most desired surfactants should be liquid (not solid) so that they can be handled easily and readily mixed with the asphalt and clay without having to apply heat or extraordinary mixing equipment.

The surfactant of the roof coating composition must be robust and capable of dispersing other ingredients and imparting appropriate viscosity to compositions including a wide range of asphalts and clays. Asphalts, in particular, lack uniformity and vary greatly in constituents. Also, as is well known in the roof coating manufacturing industry, asphalts may be oxidized or unoxidized, depending upon the practice of the asphalt manufacturer. Oxidization of the asphalt can greatly affect its characteristics. Inability of the surfactant to disperse a wide range of constituents will result in loss of viscosity and cause premature failure of the composition.

But those are not the only characteristics of a preferred roof coating. Relative freedom from odor, especially offensive odor, and compatibility with composition containers and metal surfaces are others. Freedom from corrosivity may be particularly important if the composition is used for other applications such as automobile undercoatings.

One example of a very-effective prior art asphalt-based roof coating composition is disclosed in U.S. Pat. No. 4,759,799 (Vicenzi). The roof-coating composition of the Vicenzi patent includes asphalt, clay and a surfactant. The surfactant is an alkyloxyalkylamine salt, preferably, decyloxypropylamine acetate which is sold by Tomah Products, Inc. of Milton, Wis. under the tradename PA-14 Acetate. Roof coating compositions using the PA-14 acetate surfactant have excellent performance and handling characteristics and are robust. Their premium price reflects the cost of the surfactant.

Another prior art roof coating composition is Redicote CG manufactured by Akzo Chemie of Chicago, Ill. Redicote CG is an asphalt-based roof coating composition and has the disadvantage of having an odor which some consider to be offensive. The odor issue is a particular problem during manufacture of the Redicote CG.

An inexpensive roof coating composition with improved viscosity and gel stability, which is easy to manufacture and apply, which is robust and capable of being used with a wide variety of asphalts and clays and which avoids the disadvantages of prior art roof coating compositions would represent a significant advance in the art.

OBJECTS OF THE INVENTION

It is an object of this invention to provide an improved roof coating composition and surfactant for use in such composition overcoming problems and shortcomings of the prior art.

Another object of this invention is to provide an improved roof coating composition which is relatively inexpensive.

A further object of this invention is to provide a roof coating composition with improved viscosity and gel stability.

Yet another object of this invention is to provide an improved roof coating composition which is easy to manufacture and apply.

An important object of the invention is to provide an improved roof coating composition which is robust and capable of being used with a wide variety of asphalts and clays.

It is also an object of this invention to provide an improved roof coating composition which is substantially free of odors which some may consider to be offensive.

Another object of this invention is to provide an improved roof coating composition which exhibits a reduced tendency toward flammability, particularly during blending.

An additional object of this invention is to provide an improved roof coating composition which, in certain embodiments, shows improved corrosion protection for metal surfaces such as metal storage containers and automobile underbodies.

How these and other objects are accomplished will be apparent from the descriptions of this invention which follow.

SUMMARY OF THE INVENTION

Figure 1:
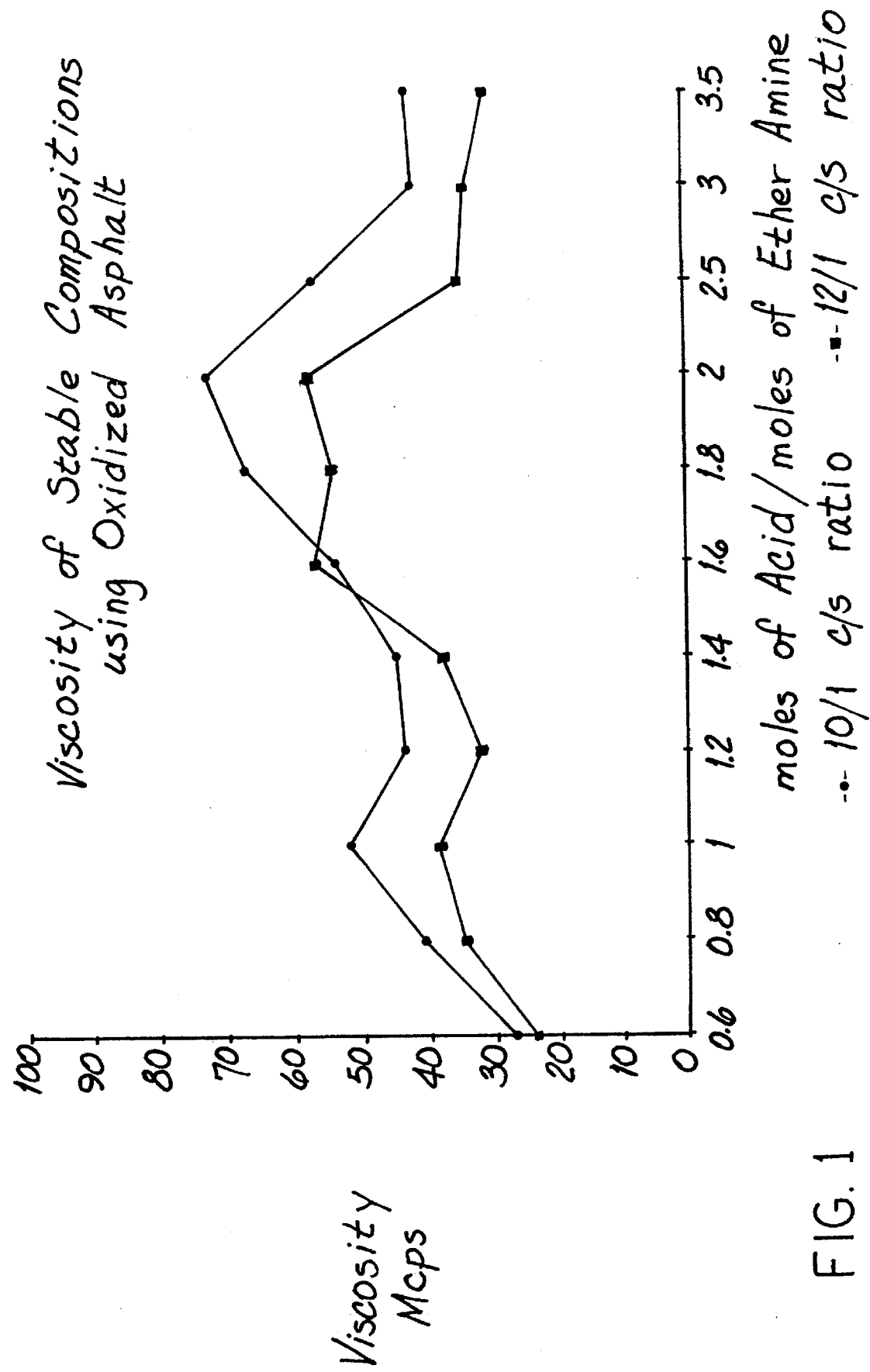
FIG. 1 is a graph showing the viscosities of exemplary compositions which include oxidized asphalt.

This invention is an improved asphalt roof-coating composition including asphalt cutback, clay and a novel surfactant composition. The composition includes about 80–95 parts by weight of a roof coating asphalt cutback, about 5–20 parts by weight of clay, and a novel ether amine-acid-complex surfactant.

The novel ether amine-acid-complex surfactant includes an alkyloxypropylamine component and an acid component, the acid being present in excess of the amount needed to neutralize the amine. As will be explained in greater detail below, the excess acid is believed to complex with the free electron pairs of the oxygen in the ether linkage of the amine to form a new surfactant with significantly enhanced properties in a roof coating composition.

The amine component of the ether amine-acid-complex surfactant is preferably an alkyloxypropylamine with an alkyl chain having from 8 to 20 carbon atoms. Highly preferred amines have an alkyl chain of 10 to 15 carbon atoms. Decyloxypropylamine is most highly preferred as the amine constituent of the surfactant.

A wide range of acids are suitable for use in forming the ether amine-acid-complex surfactant of the invention. The acid may include organic acids, inorganic acids and mixtures thereof. Organic acids having branched, linear and cyclic structures are acceptable for use in the invention. Benzoic acid and isooctanoic acid are highly preferred examples. Other highly preferred acids include: formic acid, acetic acid, hydroxyacetic acid, propionic acid, isobutyric acid, butyric acid, hydrochloric acid, phosphoric acid, dimer acids, natural oil-derived acids and mixtures thereof. Acetic acid is most highly preferred.

Preferably, the acid of the ether amine-acid-complex surfactant is present in an amount of about 1.15 to 2.50 times the amount needed to neutralize the amine (i.e., 1.15 to 2.50 molar equivalents of acid) although this is not an absolute range. When used with oxidized asphalts, it is most highly preferred that the acid be present in an amount of about 2.00 times the amount required to neutralize the amine. When used with unoxidized asphalts, it is most highly preferred that the acid be present in an amount of about 1.60 times the amount required to neutralize the amine.

The ether amine-acid-complex surfactant of the invention is liquid at room temperature and capable of being handled and admixed easily during manufacture and application. The surfactant does not need to be heated prior to use, thus avoiding any risk of fire. In addition, preferred variants of the ether amine-acid-complex surfactant, including the most preferred decyloxypropylamine complexed with acetic acid, are not corrosive and may be used with metal containers and surfaces.

The asphalt cutback is the predominant formula constituent of the composition and the amount of such asphalt cutback does not vary greatly with respect to the amount of clay and surfactant of such composition. The asphalt cutbacks best suited for this invention may be medium-cure (MC) cutbacks, rapid-cure (RC) cutbacks, or even slow-cure (SC) cutbacks. The asphalt may be oxidized or unoxidized.

In preferred embodiments of this invention, attapulgite clays are used. Such clays, which have been widely used in the non-asbestos systems of the prior art, are principally mined by Engelhard Corporation and the Floridin Company. The attapulgite clays are specially-sized and processed gelling clay products suitable for thickening asphalt-based coatings.

Depending on the asphalt cutback used and other factors, the optimal ratio of clay to surfactant (known as the "C/S ratio") is preferably from about 8:1 to about 12:1 in formulations having about 8 to 12% clay. Formulations in which the ratio of clay to surfactant is at least about 10:1 are particularly preferred because they provide good performance yet reduce cost. Cost is reduced by replacing portions of the relatively expensive amine constituent with greater amounts of the less-expensive acid.

An essential aspect of this invention is the unexpected and clearly-superior results obtained by adding acid to the surfactant in an amount 1.15 to 2.50 times the amount needed to neutralize the amine (i.e., 1.15 to 2.50 molar equivalents of acid). Until the advent of the invention, it was expected that the addition of excessive amounts of acid to such a surfactant would cause a diluent effect, thereby reducing the efficacy of the surfactant and causing a decrease in the viscosity of the roof coating. Moreover, it was believed that the presence of excess acid would have deleterious side effects such as an offensive odor.

Quite unexpectedly, the opposite occurred. It has been discovered that the addition of 1.15 to 2.50 molar equivalents of acid to the amine of the surfactant materially improves both the viscosity of the roof coating composition and the gel stability without any reduction in handling characteristics and without adverse odors. This is an extremely useful discovery because performance of the composition is unexpectedly enhanced while at the same time the cost of raw materials is reduced in that a portion of the more-expensive amine is replaced by inexpensive and abundant acids such as acetic acid.

FIG. 1 shows the enhanced viscosity of one variant of the improved roof coating composition including an oxidized asphalt, clay and a surfactant with decyloxypropylamine and varying amounts of acetic acid. The viscosity of exemplary compositions at 10:1 and 12:1 C/S ratios were measured at 7 day intervals over a 28 day period using a Brookfield Viscometer Model RVT at 10 rpm with a #7 spindle.

It is apparent from FIG. 1 that viscosity is enhanced at between 1.15 to 2.50 molar equivalents of acetic acid or, put another way, acid in an amount 1.15 to 2.50 times the amount needed to neutralize the amine. Optimal results are obtained at about 2.0 molar equivalents of acid. Moreover, the excellent viscosities as measured 28 days after preparation of the compositions demonstrate that the compositions have excellent gel stability characteristics.

Figure 2:
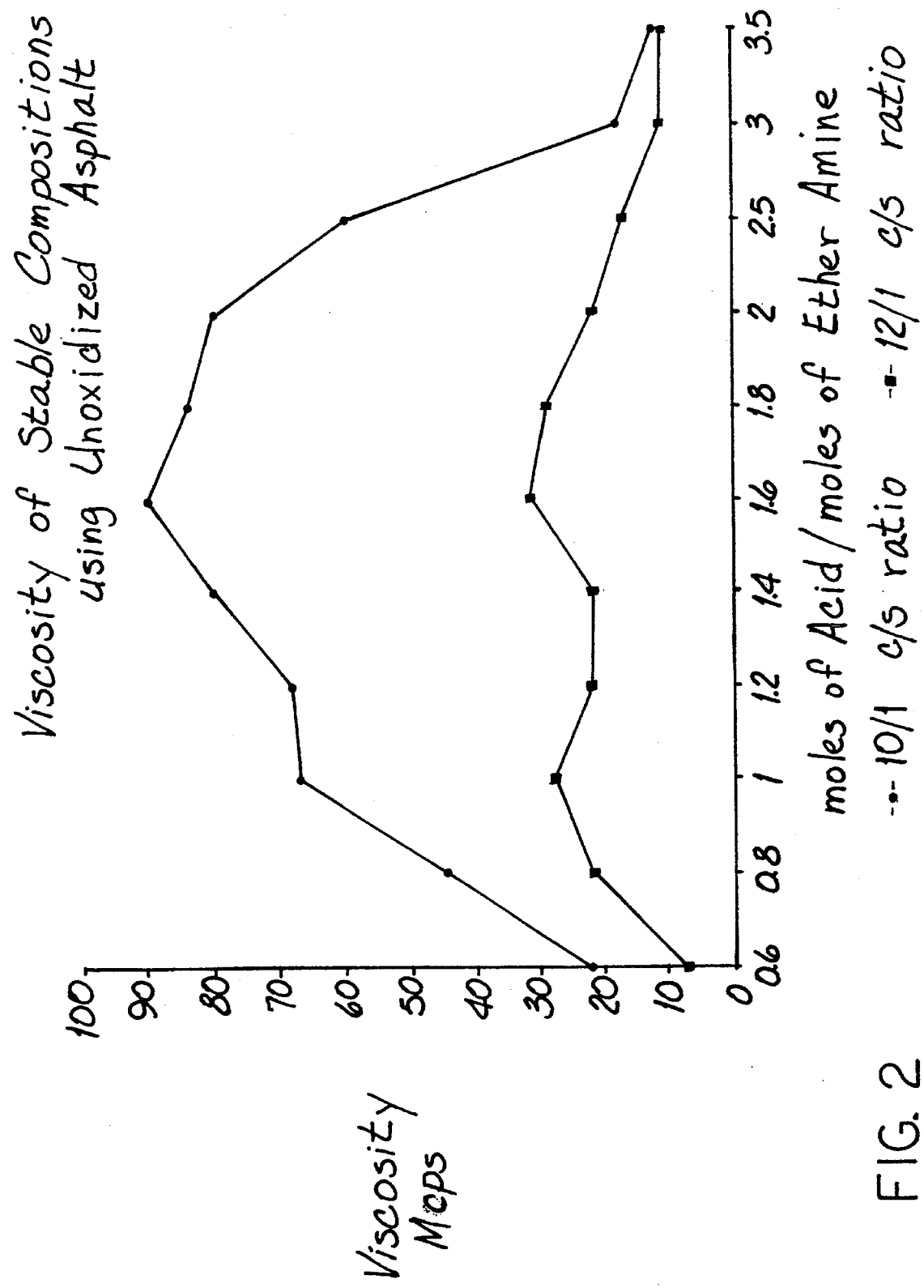
FIG. 2 is a graph showing the viscosities of exemplary compositions which include unoxidized asphalt.

FIG. 2 shows similar results based on a composition including an unoxidized asphalt, clay and a surfactant with decyloxypropylamine and varying amounts of acetic acid at C/S ratios of 10:1 and 12:1. Viscosity was again measured at 7 day intervals over a 28 day period following preparation of the compositions.

According to FIG. 2, viscosity is improved at between about 1.40 to 2.00 molar equivalents of acetic acid and optimal viscosity is achieved at about 1.60 molar equivalents of acid. The excellent viscosities of the exemplary compositions shown in FIG. 2 further demonstrate the excellent gel stability of the inventive compositions. The data demonstrate that improved results are achieved (within the limits shown) as more of the less-expensive acid is added to the surfactant.

While not wanting to be bound by any particular theory as to why this occurs, it may be that the excess acid of the surfactants used in this invention complex with the amine by forming hydrogen bonds with the oxygen of the amine-ether linkage, thereby forming a new, better performing, species. It is believed that the composition formed represents a novel ether amine-acid-complex surfactant previously unknown in the roof coating industry. This is unexpected because it would have been thought that the excess acid would act as a diluent and reduce viscosity and gel stability. The sharp reductions of viscosity shown in FIGS. 1 and 2 at approximately 3.0 molar equivalents of acetic acid (to the amine) are consistent with the hypothesis that both potential bonding sites of the ether linkage are complexed with the acid. Excess, uncomplexed, acid present at beyond 3 molar equivalents of acid has a corresponding diluent effect as shown by the sharp decreases in viscosity in FIGS. 1 and 2.

Examples of suitable asphalt cutbacks for use in this invention are: Exxon 7057, an MC cutback available from Exxon Corporation, Houston, Tex.; Gardner cutback, an MC cutback available from Gardner Asphalt Company, Tampa, Fla.; Trumbull 6009 (oxidized) and 6032 (unoxidized), available from Trumbull Asphalt, Summit, Ill.; and the asphalt cutback from Seaboard Asphalt Products Company, Baltimore, Md. Suitable asphalt cutbacks are available from many other sources.

Examples of suitable clays include: Min-U-Gel AR, an attapulgite available from Floridin Company, Berkeley Springs, W.V., and attapulgites known as ATTAGEL 36, 40, 50 and 2059, available from Engelhard Corporation, Edison, N.J. Such clays are available commercially in different particle sizes. Other clays may be used, but the attapulgites are highly preferred.

Suitable amine precursors for use in the surfactant are available from Tomah Products, Inc. of Milton, Wis. These products are sold by Tomah Products under the trade names PA-14, PA-16, PA-17, PA-19, PA-220, PA-1214 and PA-24.

Suitable acid precursors for use in the surfactant are readily available from commercial sources. These include, without limitation, formic, hydrochloric, phosphoric, and benzoic acids from Ashland Chemical Co. of Columbus, Ohio, and acetic and propionic acid from Eastman Chemical Co of Kingsport, Tenn. Hydroxyacetic acid is available from Aldrich Chemical Co. of Milwaukee, Wis. and butyric and isobutyric acid are available from Hüls America, Inc. of Piscataway, N.J.

Many dimer acids are useful in this invention. A commercial source of useful tall-oil-based acid dimers, oleic acid dimers and linoleic acid dimers is the Witco Corporation, Oleo/Surfactants Group, Greenwich, Conn.

The natural oil-derived acids are well known to the art and are obtained by saponification of the polyglyceride esters present in the respective precursor oils. Illustrative acids include corn oil acid from Arizona Chemical Co., Panama City, Fla., cottonseed acid from Witco Corporation, Humko Chemical Division, Memphis Tenn., and linseed acid and soy acid available from the Procter and Gamble Co., Cincinnati, Ohio and tall oil acid sold by Westvaco Corporation, Charleston Heights, S.C.

Fillers may also be added to the composition to provide bulk and reinforcement and shrinkage control to the composition after application. Examples of acceptable fillers are sand, mica, ground slate, diatomaceous earth, ground limestone, wollastonite, pearlite, cellulosic fibers, talc, and polyolefin fibers. Fillers are added in amounts as needed to provide desired properties in the composition.

The viscosity of the compositions of this invention may be described as pseudoplastic and thixotropic. Such properties are shown by: the gel strength of the compositions; their relatively high viscosity at low shear rates; their relatively low viscosity at high shear rates; their good uniformity in viscosity reduction in response to uniform shear applied over a period of time; and their good recoverability, that is, recovery of initial properties after shear has ended.

The gel strength contributes to stabilizing the final coating composition against settling over long periods in storage. The high viscosity at low shear rates maintains mix uniformity during processing, packaging and application. The low viscosity at high shear rates makes application easier. And the good recoverability of viscosity minimizes sag and flow after application while solvent evaporation is occurring.

PREPARATION OF THE COMPOSITIONS

Preparation of the inventive roof coating composition will vary somewhat depending on the particular constituents to be used in the composition and the type of mixing apparatus available for processing of the constituents. These processing steps are not critical and, while considerable variation is possible, certain blending procedures are preferred.

The inventive ether amine-acid-complex surfactant is prepared by admixing the amine with the selected acid, said acid being in an amount of about 1.15 to 2.50 times the amount required to neutralize the amine (i.e., 1.15 to 2.5 molar equivalents of acid). In the most highly preferred embodiments, decyloxypropylamine is admixed with about 2.0 molar equivalents of acetic acid (when the surfactant is to be used with oxidized asphalt) and 1.6 molar equivalents of acetic acid (when the surfactant is to be used with unoxidized asphalt). From a cost-reduction standpoint, an optimum surfactant includes the greatest possible ratio of acid to amine because the acid costs much less than the amine.

Blending of the asphalt, clay and surfactant tends to vary based on the processing equipment to be used. In general, if a high-shear mixer is used, the preferred order of addition involves first mixing the asphalt cutback, surfactant, and clay until they are gelled. Then any fillers are added and mixed with the gelled composition. If low-shear equipment, such as a paddle or ribbon mixer, is employed (or if the clay concentration is low in a high-shear mixer batch), the use of a pre-gelling technique is recommended to enhance gelling and optimize dispersion. The preferred pre-gelling process consists of thoroughly mixing all of the surfactant with all of the clay and a portion of the asphalt cutback (preferably about two-thirds) until a thick gel is formed. Then the remainder of the cutback and all of the filler(s) are added and thoroughly mixed. Additional solvent can be added if required after the mix is uniform.

The choice and amount of fillers added in the mix depend in part upon whether the composition is to be a brushable roof coating, a sprayable coating, or a roof cement. The desired final viscosity and texture of the asphalt coating composition can be adjusted by the fillers which are added.

Determining the optimum amount of the inventive amine-acid complex surfactant in a coating is critical. The optimum is considered the least amount (that is, the highest C/S ratio) providing the desired gel characteristics and stability. The optimum ratio depends primarily on the specific alkyloxypropylamine and acid precursors selected, the asphalt used, the degree of asphalt oxidation, and the clay used. Therefore, an optimum ratio must be determined for each combination.

One method of determining the optimum C/S ratio is to run a ladder of C/S ratios in a mix of a particular ratio of the chosen clay to the combination of the surfactant and chosen asphalt cutback—for example, 12 parts by weight clay to 88 parts by weight asphalt cutback and surfactant combined.

The C/S ratio may then be varied in 0.5/1 increments (within what is considered an acceptable range), and readings on the gel characteristics of the resulting compositions should be taken at periodic intervals after mixing (such as 24 and 36 hours and several times during a week until a final reading one week after mixing). Temperature and pressure conditions should preferably be controlled during the period of such testing.

The range of ratio increments tested need not be broad, but may start, for example, around 8:1 and extend to perhaps 10:1 or 12:1. Once the optimum C/S ratio is established for a particular asphalt cutback and clay, the same "recipe" can be used with confidence and without further testing to produce coating compositions of this invention made with such cutback and clay at the predetermined C/S ratio.

The instruments and procedures for measuring gel characteristics will not be described here. It is preferred that the recommended ASTM test procedures be used, but any appropriately sensitive test instrument (such as a good penetrometer) and reliable test procedure will be acceptable if properly used.

Large variations in the readings of the gel characteristics over the course of the test period indicate a lack of gel stability. This tends to indicate an unacceptable C/S ratio or some other unacceptable characteristic in the formula. Steady readings are what is desired, provided they show sufficient gel strength.

EXAMPLES OF THE INVENTION

In each of the examples which follow, an asphalt-based coating composition was made using either low-shear or high-shear blending techniques, adding and mixing the listed constituents in the manner described above. For each example the formulation is listed and comments regarding the formulation or the resulting composition are given.

Example 1

| | |
|---|---|
| Trumbull Asphalt Cutback #6009 | 87.00 parts |
| Attagel 36 | 12.00 parts |
| Surfactant | 1.00 part |

This composition includes an oxidized asphalt, attapulgite clay and an ether amine-acid-complex surfactant consisting of a decyloxypropylamine precursor (Tomah PA-14) admixed with 1.6 molar equivalents of acetic acid. The low shear blending technique can be used for this composition resulting in an excellent asphalt roof coating composition.

Example 2

| | |
|---|---|
| Trumbull Asphalt Cutback #6032 | 89.00 parts |
| Attagel 36 | 10.00 parts |
| Surfactant | 1.00 part |
| Talc | 21.00 parts |
| Interfiber 231 | 3.00 parts |

This composition shows the use of unoxidized asphalt, an attapulgite clay, various fillers and an ether amine-acid-complex surfactant consisting of a decyloxypropylamine precursor (Tomah PA-14) admixed with 1.5 molar equivalents of formic acid.

Example 3

| | |
|---|---|
| Trumbull Asphalt Cutback #6009 | 86.30 parts |
| Attagel 36 | 12.00 parts |
| Surfactant | 1.70 parts |
| 325 Mesh Silica | 21.00 parts |

This composition represents a good roof coating composition. The ether amine-acid-complex surfactant of the example includes an alkyloxypropylamine precursor with a linear carbon chain length of 16 to 18 carbon atoms (Tomah PA-2220). 1.8 molar equivalents of acetic acid are included in Example 3 (i.e., 1.8 times the acid needed to neutralize the amine). Example 3 has a 7:1 C/S ratio and a silica filler.

Example 4

| | |
|---|---|
| Gardner Asphalt Cutback | 89.00 parts |
| Min-U-Gel AR attapulgite clay | 12.00 parts |
| Surfactant | 1.00 part |
| Sand | 21.00 parts |
| Gound Slate | 5.00 parts |

This composition consists of an asphalt cutback (oxidative state unknown) and an ether amine-acid-complex surfactant which includes a decyloxypropylamine precursor (Tomah PA-14) admixed with 2.5 molar equivalents of benzoic acid together with clay and sand and slate fillers. The composition has a 12:1 C/S ratio and forms a well-gelled roof coating composition.

Example 5

| | |
|---|---|
| Trumbull Asphalt Cutback #6009 | 89.70 parts |
| Attagel 36 | 9.00 parts |
| Surfactant | 1.30 parts |
| Diatmoaceous earth | 18.00 parts |
| Interfiber 231 | 3.00 parts |

Example 5 includes an oxidized asphalt and an ether amine-acid-complex surfactant consisting of a tridecyloxypropylamine precursor (Tomah PA-17) admixed with 1.6 molar equivalents of hydrochloric acid, which, of course, is an inorganic acid. The composition produces gel characteristics consistent with roof coating compositions at lower clay levels.

Example 6

| Trumbull Asphalt Cutback #6009 | 89.00 parts |
|---|---|
| Attagel 36 | 10.00 parts |
| Surfactant | 1.00 part |
| 200 Mesh limestone (James River) | 41.00 parts |
| Interfiber 430 (Sullivan Chemical) | 4.00 parts |

Example 6 includes an oxidized asphalt and an ether amine-acid-complex surfactant consisting of a decyloxypropylamine precursor (Tomah PA-14) admixed with a blended organic/inorganic acid comprising 1.2 molar equivalents of acetic acid and 0.4 molar equivalents of phosphoric acid. The composition shows good gel characteristics.

Example 7

| Trumbull Asphalt Cutback #6009 | 87.00 parts |
|---|---|
| Attagel 36 | 12.00 parts |
| Surfactant | 1.00 part |
| Interfiber 430 | 4.00 parts |
| 200 Mesh limestone | 41.00 parts |

This composition includes an oxidized asphalt, attapulgite clay, an ether amine-acid-complex surfactant comprising a decyloxypropylamine precursor (Tomah PA-14) admixed with 1.15 molar equivalents of acetic acid. Fillers are included.

The compositions of this invention are applied to various surfaces in the same manner as the compositions of the prior art are applied. They are usable as roof coatings, roof cements, vehicle undercoatings, pipe coatings, mastics and adhesives, and for many other purposes.

While the principles of this invention have been described in connection with specific embodiments, it should be understood clearly that these descriptions are made only by way of example and are not intended to limit the scope of the invention.

We claim:

1. In an asphalt roof-coating composition including clay and a surfactant, the improvement comprising:
   about 80–95 parts by weight of a roof-coating asphalt cutback;
   about 5–20 parts by weight of clay; and
   an ether amine-acid-complex surfactant comprising an alkyloxypropylamine with an alkyl chain having form 8 to 20 carbon atoms and an acid present in excess of the amount required to neutralize the amine.

2. The composition of claim 1 wherein the alkyl chain of the amine has from 10 to 15 carbon atoms.

3. The composition of claim 2 wherein the amine is decyloxypropylamine.

4. The composition of claim 1 wherein the acid is selected from the group consisting of organic acids, inorganic acids and mixtures thereof.

5. The composition of claim 4 wherein the acid is selected from the group consisting of benzoic acid, formic acid, acetic acid, hydroxyacetic acid, propionic acid, isobutyric acid, butyric acid, hydrochloric acid, phosphoric acid, dimer acids, oil-derived acids and mixtures thereof.

6. The composition of claim 5 wherein the acid is acetic acid.

7. The composition of claim 1 wherein the acid is present in an amount of about 1.15 to 2.50 times the amount required to neutralize the amine.

8. The composition of claim 7 wherein the asphalt is oxidized and acid is present in an amount of about 2.00 times the amount required to neutralize the amine.

9. The composition of claim 7 wherein the asphalt is unoxidized and the acid is present in an amount of about 1.60 times the amount required to neutralize the amine.

10. The composition of claim 1 wherein the clay is attapulgite.

11. The composition of claim 10 wherein the composition comprises 8 to 12 parts clay.

12. The composition of claim 1 further including fillers in an amount present to provide bulk.

13. The composition of claim 12 wherein the fillers are selected from the group consisting of sand, mica, ground slate, diatomaceous earth, ground limestone, wollastonite, pearlite, cellulosic fibers, talc, and polyolefin fibers.

14. In an asphalt roof-coating composition including clay and a surfactant, the improvement comprising:
   about 80–95 parts by weight of a roof-coating asphalt cutback;
   about 5–20 parts by weight of clay; and
   an ether amine-acid-complex surfactant comprising an decyloxypropylamine and an acid present in an amount of about 1.15 to 2.50 times the amount required to neutralize the amine.

15. The composition of claim 14 wherein the acid is acetic acid.

16. The composition of claim 15 wherein the clay is attapulgite and forms about 8 to 12 parts of the composition.

17. The composition of claim 16 further including fillers selected from the group consisting of sand, mica, ground slate, diatomaceous earth, ground limestone, wollastonite, pearlite, cellulosic fibers, talc, and polyolefin fibers in an amount present to provide bulk.

* * * * *